United States Patent
Beekman

(10) Patent No.: US 12,535,601 B2
(45) Date of Patent: Jan. 27, 2026

(54) GAMMA CAMERA DEVICE AND COLLIMATOR

(71) Applicant: Milabs B.V., Houten (NL)

(72) Inventor: Frederik Johannes Beekman, Houten (NL)

(73) Assignee: MILABS B.V., Houten (NL)

( * ) Notice: Subject to any disclaimer, the term of this patent is extended or adjusted under 35 U.S.C. 154(b) by 97 days.

(21) Appl. No.: 18/029,820

(22) PCT Filed: Sep. 29, 2021

(86) PCT No.: PCT/IB2021/000656
§ 371 (c)(1),
(2) Date: Mar. 31, 2023

(87) PCT Pub. No.: WO2022/069936
PCT Pub. Date: Apr. 7, 2022

(65) Prior Publication Data
US 2023/0408710 A1    Dec. 21, 2023

(30) Foreign Application Priority Data

Oct. 2, 2020   (NL) .................................... 2026609

(51) Int. Cl.
*G01T 1/16*    (2006.01)

(52) U.S. Cl.
CPC ...................... *G01T 1/16* (2013.01)

(58) Field of Classification Search
CPC ........................................ G01T 1/16
See application file for complete search history.

(56) References Cited

U.S. PATENT DOCUMENTS

| 6,353,227 B1 * | 3/2002 | Boxen | G21K 1/025 |
| | | | 250/363.1 |
| 2007/0029491 A1 * | 2/2007 | Olden | G01T 1/1648 |
| | | | 250/370.08 |

(Continued)

FOREIGN PATENT DOCUMENTS

| EP | 2 073 039 A1 | 6/2009 |
| JP | 2009-20102 A | 1/2009 |

OTHER PUBLICATIONS

Dutch Search Report, issued in Priority Application No. 2026609, dated Jun. 9, 2021.

(Continued)

*Primary Examiner* — Hugh Maupin
(74) *Attorney, Agent, or Firm* — Birch, Stewart, Kolasch & Birch, LLP

(57) ABSTRACT

A gamma camera device includes a collimator with pinholes which surrounds an object space for receiving an object, a detector surface for detecting gamma radiation emitted by the object and passing through pinholes of the collimator, and a controller for processing the detector signals into an image of the object. The collimator and the object space have a common longitudinal axis, wherein the collimator includes a plurality of groups each of multiple pinholes with a central line. In each group, the pinholes lie in a plane perpendicular to the longitudinal axis, wherein the pinholes of the groups together see a focus volume, which focus volume has a geometric center. Within each group, on a rotation around said longitudinal axis, the respective central line of each of said pinholes becomes congruent with the central line of each of the other pinholes of the group.

16 Claims, 6 Drawing Sheets

(56) References Cited

U.S. PATENT DOCUMENTS

| | | | |
|---|---|---|---|
| 2008/0048124 A1* | 2/2008 | Pang | A61B 6/482 |
| | | | 250/363.04 |
| 2008/0237472 A1* | 10/2008 | Uribe | A61B 6/037 |
| | | | 250/363.1 |
| 2008/0237476 A1* | 10/2008 | Uribe | G01T 1/1611 |
| | | | 250/363.04 |
| 2009/0022278 A1 | 1/2009 | Hugg et al. | |
| 2009/0114825 A1* | 5/2009 | Beekman | G01T 1/1642 |
| | | | 250/362 |
| 2009/0159802 A1* | 6/2009 | Beekman | G01T 1/1648 |
| | | | 250/363.1 |
| 2015/0380121 A1* | 12/2015 | Beekman | G21K 1/025 |
| | | | 378/147 |
| 2017/0020467 A1* | 1/2017 | Beekman | A61B 6/06 |
| 2017/0215822 A1* | 8/2017 | Da Rocha Vaz Pato | |
| | | | G21K 1/025 |
| 2019/0117174 A1* | 4/2019 | Lee | A61B 6/12 |

OTHER PUBLICATIONS

International Search Report, issued in PCT/IB2021/000656, dated Feb. 4, 2022.
Li et al., "Off-Axis Imaging in Keel-Edge Pinhole Single Photon Emission Computed Tomography System Based on Monte Carlo Simulation", Chin. Phys. Lett., 2016, vol. 33, No. 4, pp. 048701-1 to 048701-4.
Written Opinion of the International Searching Authority, issued in PCT/IB2021/000656, dated Feb. 4, 2022.

\* cited by examiner

GAMMA CAMERA DEVICE AND COLLIMATOR

FIELD OF THE INVENTION

The invention concerns a gamma camera device for producing an image of an object by means of gamma radiation, comprising a collimator with pinholes which surrounds an object space for receiving the object, a detection device with at least one detector with a detector surface for detecting, as detector signals, gamma radiation emitted by the object and passing through pinholes of the collimator, and a controller which is configured for processing the detector signals into said image of the object, wherein the collimator and the object space have a common longitudinal axis, wherein the collimator comprises a plurality of groups each of multiple pinholes each having a central line, wherein for each of said groups, the pinholes lie in a plane perpendicular to the longitudinal axis, wherein the pinholes of said groups together see a focus volume, which focus volume has a geometric center.

Such gamma camera devices are known from the prior art. The company MILabs markets the VECTor system, a gamma camera with a collimator which has so-called "cluster pinholes" which are also described in EP 2073039.

A disadvantage of the known system is that the images obtained are not always sharp, in particular for the higher photon energies, and/or that it is not easy to obtain adequate angular information of the object to be imaged.

OBJECT OF THE INVENTION

It is an object of the present invention to improve the known device such that the sharpness increases, in particular for said higher photon energies, and/or such that it is easier to obtain sufficient angular information.

SUMMARY OF THE INVENTION

The invention achieves one or more of these objects, in any case partially, with a gamma camera device for producing an image of an object by means of gamma radiation, comprising:

a collimator with pinholes, which collimator extends about an object space configured for receiving the object, a detection device with at least one detector having a detector surface for detecting, as detector signals, gamma radiation emitted by the object and passing through pinholes of the collimator, and a controller which is configured for processing the detector signals into said image of the object.

The collimator and the object space have a common longitudinal axis with a longitudinal direction.

The collimator comprises a plurality of groups of pinholes, each group composed of multiple pinholes, each pinhole having a central line, wherein for each of said groups, the pinholes lie in a plane perpendicular to the longitudinal axis.

The pinholes of said groups together see a focus volume, which focus volume has a geometric center. Within each of said groups, the respective central line of each of said pinholes passes said longitudinal axis at a distance therefrom, and on a rotation around said longitudinal axis, the central line becomes congruent with the central line of each of the other pinholes of said group.

Without being restricted to one explanation, this configuration avoids or reduces the effect perceived with the known gamma camera device, that the radiation penetrates the collimator at the site of the material directly between the pinholes of one cluster or pinhole system. See for example FIG. 2b of the cited document EP 2073039, where for example the pointed top of the central part 30 is susceptible to this penetration and hence to a reduction in resolution. In addition, the distance between adjacent pinhole systems in EP 2073039 is unnecessarily large, since for example the pinhole cones running relatively far towards the outside at the bottom of FIG. 2b mean that the adjacent clusters must be arranged further apart than would be necessary on the other side (at the top in the figure). In this prior art, two or more pinholes which each see only part of the focus volume are combined into a pinhole system or cluster which sees the entire focus volume as a whole. Each of the pinholes in the pinhole system then has a central line which makes an angle with the collimator surface at that point.

According to the present invention, the pinholes of a cluster are in fact separate from one another and combined by "type" in a plane perpendicular to the longitudinal axis of the collimator. With this measure, the pinhole cones of the pinholes in the plane are more (but not completely) parallel and obstruct each other less. In this way, on average more distance will be present between the pinhole cones, and there will be no pointed and thin area as in EP 2073039, whereby less penetration and resolution loss occurs. Alternatively or additionally, they may be placed relatively closer together so that it is easier to collect more, or in any case sufficient, angular information concerning the object, such as the isotope distribution in the object.

An alternative explanation is based on the known tubular focused pinhole collimator, as is known for example from the U-SPECT-I system, in which all pinholes, which are placed in annular arrangements each lying in a respective plane perpendicular to the longitudinal axis of the collimator, are directed at one and the same point. All pinholes of the collimator thus have mutually overlapping field of views, wherein the volume seen through all pinholes, or in any case the majority thereof, is indicated as the focus volume. With respect to this known gamma camera device with this known collimator, the present invention provides the improvement that all pinholes have a narrower field of view, for example an image angle which amounts to at least 50% to e.g. 75% of the original image angle, and therefore are less susceptible to penetration. The pinholes of the annular arrangement are then however no longer all directed at the same point, being the centre point or geometric center of the focus volume, but eccentrically, i.e. directed onto a theoretical circle around said point in a plane perpendicular to the longitudinal axis of the collimator. Also, for complete overlap, wherein the same central focus volume as before is still seen by the pinholes as a whole, it is indeed necessary for said point to fall within the field of view of each pinhole, but it is sufficient if this does not lie in the central line of the or each field of view but more towards the edge thereof. It is now indeed necessary to combine multiple or all pinhole field of views per annular arrangement in order to obtain the same focus volume, but because of the smaller image angle per pinhole, it is for example possible to place more pinholes per annular arrangement in the collimator.

In the present application, a central line means the line of maximum transmission. This is often but not necessarily the longitudinal axis or axis of symmetry of the pinhole. Also, the phrase "the pinholes lie in one plane" means that each of the pinholes, with its tip or part of smallest cross-section, i.e.

the "actual" pinholes, lie in one plane. The field of view is the part of the space which is imaged on the detector via the pinhole. The geometric center of the field of view is the geometric center of a homogenous body with the contours of the focus volume.

It is pointed out here that, for reasons related to imaging technology, it is useful but not necessary for the geometric center of the focus volume to lie within the image angle of an individual pinhole. The extent to which the central line of the pinhole stands obliquely relative to the longitudinal axis of the object space/collimator is selected accordingly. This guarantees that in each group, the field of views of the pinholes form a continuous closed volume, of which the focus volume forms part. This focus volume can be regarded as part of the space which is seen through at least one pinhole of each group.

It will also be clear that the advantages cited in the prior art for a cluster pinhole, namely usable for higher photon energies due to the smaller required opening angle of the pinholes, are equally applicable to the present invention. Therefore, for a description of the further favourable effects of the present invention, reference is made to paragraphs 11 and 26 of EP 2073039 B1.

Both the explanation given above and the descriptions will be clarified further in the drawing and in the description thereof. Furthermore, particular embodiments of the invention are described in the dependent claims and in the following part of the description introduction.

In a practical embodiment, each pinhole is configured as passage of unchanging shape in the wall of the collimator.

In a practical embodiment, all pinholes of the collimator are placed in a fixed unchangeable arrangement with respect to one another. For example, all pinholes are configured as a passage of unchanging shape in the wall of the collimator, for example in a physical ring of one or more rings which when stacked form the collimator.

In some embodiments, the respective central line of the first group of said groups, viewed from the respective pinhole, in each case passes said geometric center to the right thereof, and the respective central line of the second group of said groups, viewed from the respective pinhole, in each case passes said geometric center to the left thereof. The term "pass to the right" or "pass to the left" here means that the respective central line, viewed from the associated pinhole, runs to the right or left respectively along the geometric center of the focus volume, and hence keeps the geometric center on the left or right side. For reasons of symmetry, this may have advantages in the reconstruction of the recorded images into an isotope distribution.

In particular embodiments, the gamma camera device comprises multiple first groups and/or multiple second groups. This creates the possibility of collecting image information from more different directions, namely because the different groups lie at different distances along the longitudinal direction. Advantageously, the number of first groups differs by maximum 1 from the number of second groups, and more advantageously the two numbers are equal, which allows a mathematically simpler structure of the collimator, for example wherein a first group and a second group are arranged mirror-symmetrically in a plane perpendicular to the longitudinal axis and through the geometric center of the focus volume. Other arrangements are however also possible.

In some embodiments, the first and second groups alternate with one another viewed in said longitudinal direction. In other words, always one second group is arranged between each pair of first groups, and vice versa. This achieves the following advantage. Because all pinholes in a group to some extent look obliquely towards the object, the image distance differs comparatively greatly in one direction from the one edge of the image to the other edge. To compensate for this, it is favourable if the pinholes of the next group are oriented obliquely towards the other edge, so that the part of the image which first lies furthest away from the pinhole in the one group now lies closest to the corresponding pinhole in the next group.

In some embodiments, the central lines of both one or each said first group and the central lines of one or each said second group pass said geometric center at a distance not equal to zero. In fact, then a pinhole of the first group and an associated pinhole of the second group together form a cluster, as known in itself from EP 2073039, but because they are physically further apart from one another in these embodiments of the present invention, much less penetration occurs. As already stated above, preferably the geometric center of the focus volume always forms part of the field of view of the individual pinholes.

In particular, said distance differs for at least two of the first groups and/or for at least two of the second groups. Thus it is possible to give the pinholes of the first or second groups an even smaller image angle and hence make them less susceptible to penetration, but still image the focus volume by means of all pinholes of the first or second groups. Here, a first part of the pinholes has a central line with a smaller distance from the geometric center, and this first part "sees" an innermost part of the focus volume while a second part of the pinholes passes at a greater distance from the geometric center, and sees an outermost part of the focus volume. Also, this can be extended to larger numbers and different distances. So this is an explicit exception to the statement made above, that each pinhole field of view preferably includes the geometric center. This embodiment in principle corresponds to the n×n cluster pinholes of EP 2073039, with n≥3, wherein the focus volume is also constructed from more than two field of views.

These embodiments could also be regarded as each comprising a "fanning out" of pinhole field of views, wherein the respective central lines of the pinholes make different angles with the respective associated line from said pinhole to said geometric center, such that the different field of views which are directed at different angles always together image the focus volume on the detector. Note here that the pinholes on rings at different distances also make different angles.

In some embodiments, at least one and advantageously each of said groups is rotationally symmetrical around said longitudinal axis, namely by placing the pinholes per group evenly distributed over 360°. Although this is not necessary, it creates the possibility of obtaining as large as possible a number of pinholes per group with a predefined minimum distance in between. The latter serves to prevent the occurrence of penetration. It is expressly pointed out that these embodiments make more pinholes possible both per group and in total than in the prior art, so that the radiation sensitivity can increase accordingly.

In some embodiments, the collimator comprises one or more annular collimator parts, each with one or more of said groups. Thus the collimator may comprise a single physical ring of collimator material which is provided with all groups of pinholes, or two or more physical rings, known as part rings, of collimator material, each with either one group or with multiple groups.

If desired, the collimator may be constructed in modular fashion. It is noted here that the term "ring" means not only a circular or cylindrical ring but also any other closed surrounding body, such as a triangle or other polygon, such as example a hexagon, octagon etc. In addition, the or each physical ring of collimator material may itself consist of two or more parts. Thus a ring may be constructed from two half cylinders, or from x number of straight plate parts which form an x-sided polygon, etc.

In some embodiments, the gamma camera device furthermore comprises a supplementary group of pinholes, preferably precisely one supplementary group of pinholes, of which the respective central lines intersect said geometric center of the focus volume. This supplementary group is then preferably, for symmetry considerations, placed in a plane perpendicular to the longitudinal axis through the geometric center. In particular, the central lines then all lie in a plane perpendicular to the longitudinal axis. Note that this supplementary group is not included in any alternation of the first and second groups in the longitudinal direction of the collimator. However, it is indeed possible to also configure these pinholes in the sense of the present invention, by not directing them onto the longitudinal axis, in this case the geometric center, but also eccentrically, i.e. the central lines of this supplementary group of pinholes also pass the longitudinal axis at a distance from the longitudinal axis. These pinholes may then together still always image the central focus volume but individually have a smaller image angle than would be necessary for seeing the entire focus volume themselves.

The invention also concerns a collimator for imaging of an object, for example a small animal or part thereof, by means of gamma radiation emitted by the object, using a gamma camera device provided with the collimator. The collimator has pinholes and extends about an object space for receiving the object. The gamma camera device is provided with a detection device having at least one detector with a detector surface for detecting, as detector signals, gamma radiation emitted by the object and passing through pinholes of the collimator, and a controller which is configured for processing the detector signals into said image of the object. The collimator and the object space have a common longitudinal axis with a longitudinal direction. The collimator comprises a plurality of groups each of multiple pinholes each with a central line. For each of said groups, the pinholes lie in a plane perpendicular to the longitudinal axis. The pinholes of said groups together see a focus volume which has a geometric center. Within each of said groups, the respective central line of each of said pinholes passes said longitudinal axis at a distance therefrom. Within each of said groups, on a rotation around said longitudinal axis, the respective central line of each of said pinholes becomes congruent with the central line of each of the other pinholes of said group.

The collimator may furthermore comprise one or more of the details and options as described herein.

The invention furthermore concerns a method for imaging of an object, for example a small animal or part thereof, by means of gamma radiation emitted by said object, using a gamma camera device and/or collimator as described herein.

The invention will now be explained in more detail with reference to the drawing which shows some non-limitative exemplary embodiments:

DETAILED DESCRIPTION OF EMBODIMENTS

Figure 1:
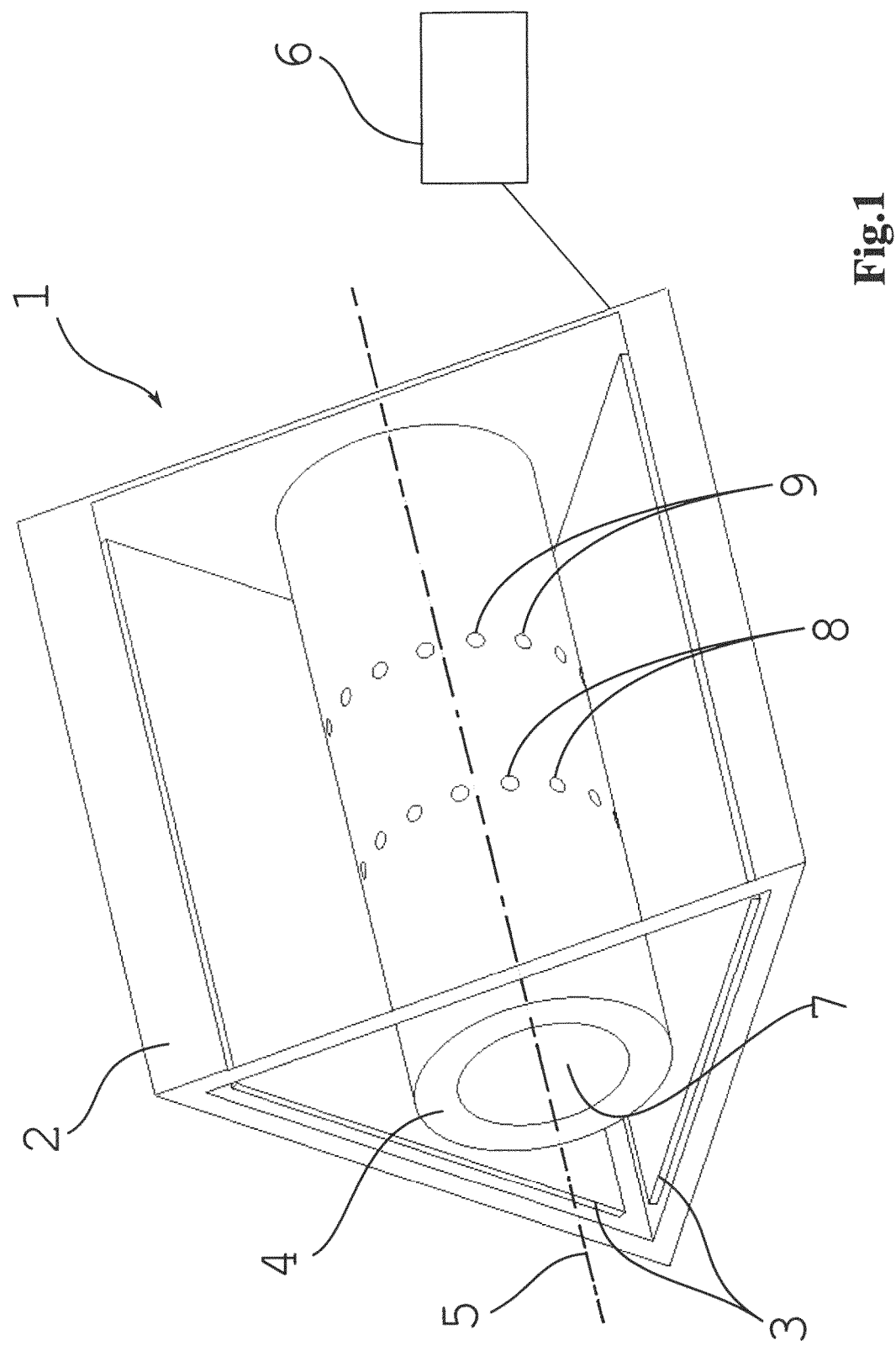
FIG. 1 schematically shows, a perspective view of a gamma camera device according to the invention, FIG. 2 schematically shows, a cross-sectional view of a part of a collimator 4' according to the prior art, in particular according to EP 2073039, FIG. 3 schematically shows, a cross-sectional view of one part of a comparable collimator 4", FIG. 4 schematically shows, in a partially open side view, a part of a collimator 4' of a gamma camera device according to the invention, FIG. 5 schematically shows, a side view of a collimator 4" viewed along the longitudinal direction, and FIG. 6 schematically shows, a side view of a collimator 4'''.

FIG. 1 shows schematically a perspective view of a gamma camera device according to the invention. The gamma camera device is generally indicated with reference sign 1. The device comprises a housing 2 with detectors 3 arranged therein, a collimator 4 with a longitudinal axis and a controller 6 with image-processing functionality which is connected to the detectors 3.

The collimator 4 surrounds an object space 7.

In this example, the collimator comprises a first group of pinholes 8 and a second group of pinholes 9.

The gamma camera device 1 shown here has a triangular housing 2, as known for example from the first U-SPECT by the company MILabs, but other housing shapes such as quadrangular or round are also possible.

For the sake of clarity, the third detector 3 has been omitted in FIG. 1. The configuration of the detectors 3 is triangular, which is an advantageous embodiment, for example in combination with a collimator of circular cross-section.

The housing 2 is made for example from lead or another material so as to counter, as far as possible, a deflection of the gamma radiation towards the environment, unless this is technically not necessary.

It is noted here that the gamma camera device 1 is not shown to scale in the drawing for the sake of clarity, and in reality the collimator 4 may be much smaller with respect to the housing 2 with detectors 3 in order to obtain a favourable image standard.

Some detectors 3 are arranged within the housing 2, here against the walls, and under the influence of incident gamma radiation emit electrical signals which can be received and processed by the controller 6. This controller 6 can process the signals into an image of an object placed in the object space 7. Said object is for example an animal, for example a small animal for biological or pharmaceutical research, or human or part thereof, which animal or human has been given a dose of gamma-active material. Said animal or human thus emits gamma radiation. In order to obtain a spatially resolved image, it is necessary to use an imaging mechanism. In the case of gamma radiation, this is pinholes (known in themselves), here in the form of a collimator 4 with a first group of pinholes 8 and a second group of pinholes 9.

The collimator 4 is made for example from lead or tungsten, possibly as one single physical ring, or composed from multiple rings which are attached to one another axially.

Both groups of pinholes 8, 9 are produced as a ring or annular arrangement of pinholes placed in a plane perpendicular to the common longitudinal axis 5 of the object space 7 and of the collimator 4. It is noted here that more than two groups of pinholes may be provided.

It is also pointed out here that, for the sake of clarity, some components have been omitted, such as for example an object carrier, for example a plate on which the object to be examined rests, and possibly displacement means for moving the object carrier with the object in the object space 7, for example for introducing the object into and removing the object from the object space at one end.

It is also pointed out here that, as known in itself, frame plates or partitions may be provided which limit the images of the pinholes on the detectors in order to prevent overlap, screening at the start and end of the object space etc. Such components do not form part of the invention itself, and the person skilled in the art may himself easily provide details concerning these components.

The function of the invention will now be explained in more detail with reference to FIGS. 2-6, showing the groups 8 and 9.

Figure 2:
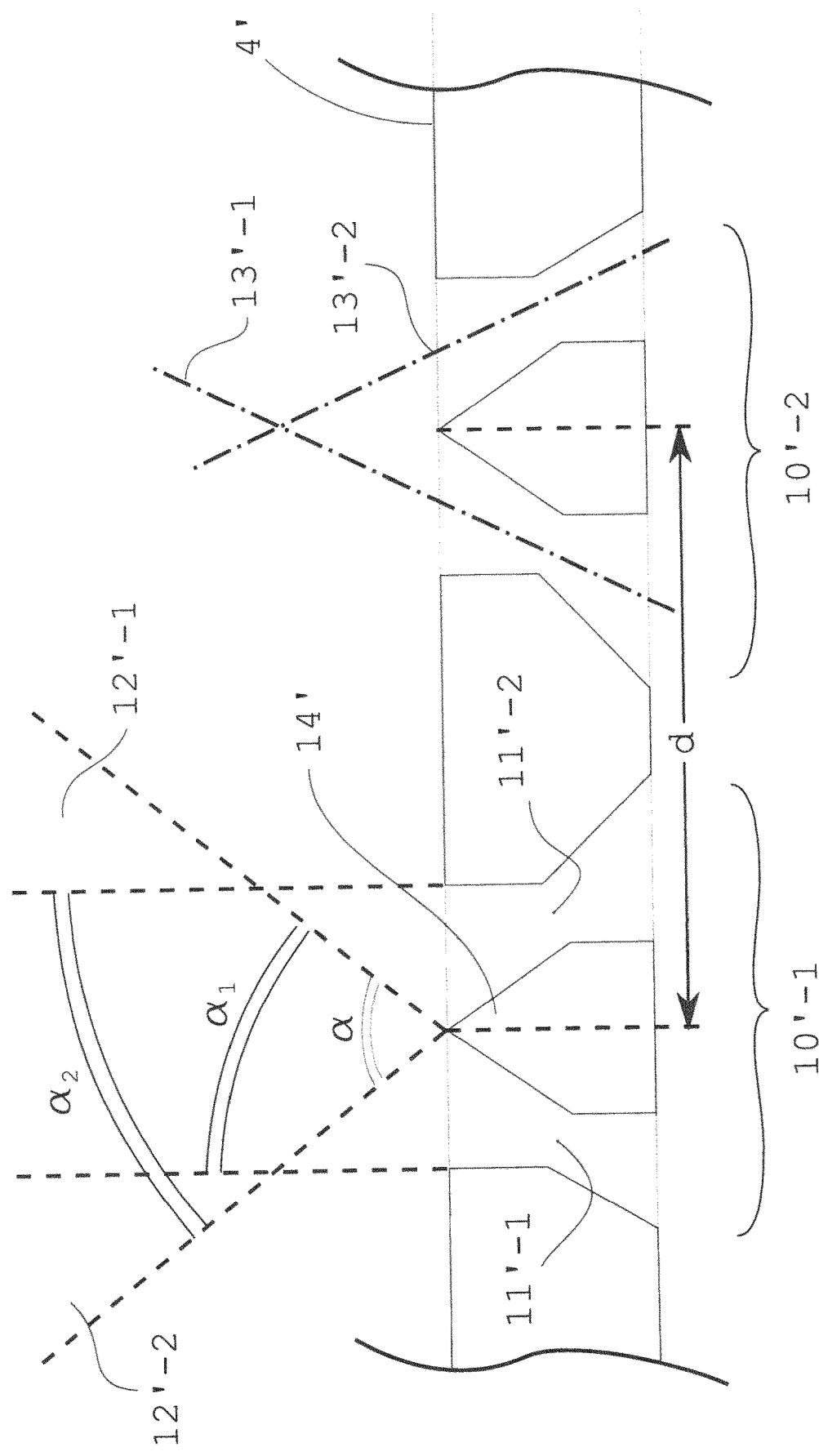

FIG. 2 shows in schematic cross-section a part of a collimator 4' according to the prior art, in particular according to EP 2073039. This illustration shows two clusters 10'-1 and 10'-2 each of two pinholes 11'-1 and 11'-2, with respectively a field of view 12'-1 with image angle $\alpha_1$ and a central line 13'-1, and a field of view 12'-2 with an image angle $\alpha_2$ and a central line 13'-2. The common image angle of the pinholes in a cluster is $\alpha$. Reference sign 14' designates a pointed part of the collimator susceptible to penetration, where the pinholes are close together. It is pointed out here that, for the sake of clarity, for each pinhole only one of the field of view and central line is indicated, but all pinholes have both a corresponding field of view and corresponding central line. It is also pointed out that in this prior art, in practice the distance between clusters is greater in conjunction with the enlarged imaging on the detectors.

This collimator 4' is here shown as a flat plate by way of example, which is one possibility. Nonetheless, and in the context of the invention, a collimator with round or circular cross-section has advantages with respect to imaging on a detector surface.

The collimator 4' here has two shown clusters 10'-1 and 10'-2, each of two pinholes which together see an image angle $\alpha$, while the pinholes 11'-1 and 11'-2 each see a field of view with a half angle $\alpha_1$ or $\alpha_2$. Initially, this makes the "knife edges" of the pinholes, i.e. the narrowest part or the actual pinhole, harder or more resistant to penetration by gamma radiation.

Because of the differently sloping central lines of the pinholes in a cluster, the distance between the clusters is however relatively large, namely d in FIG. 2. Therefore the maximum number of pinhole clusters in a collimator of a certain length is limited, and hence also the radiation sensitivity of the gamma camera system. In addition, at the point 14 between the pinholes 11'-1 and 11'-2 of a cluster, some blurring may occur. To prevent this, the individual pinholes of the cluster may be moved further apart, but this lowers the maximum density of pinholes in the collimator even further.

Figure 3:
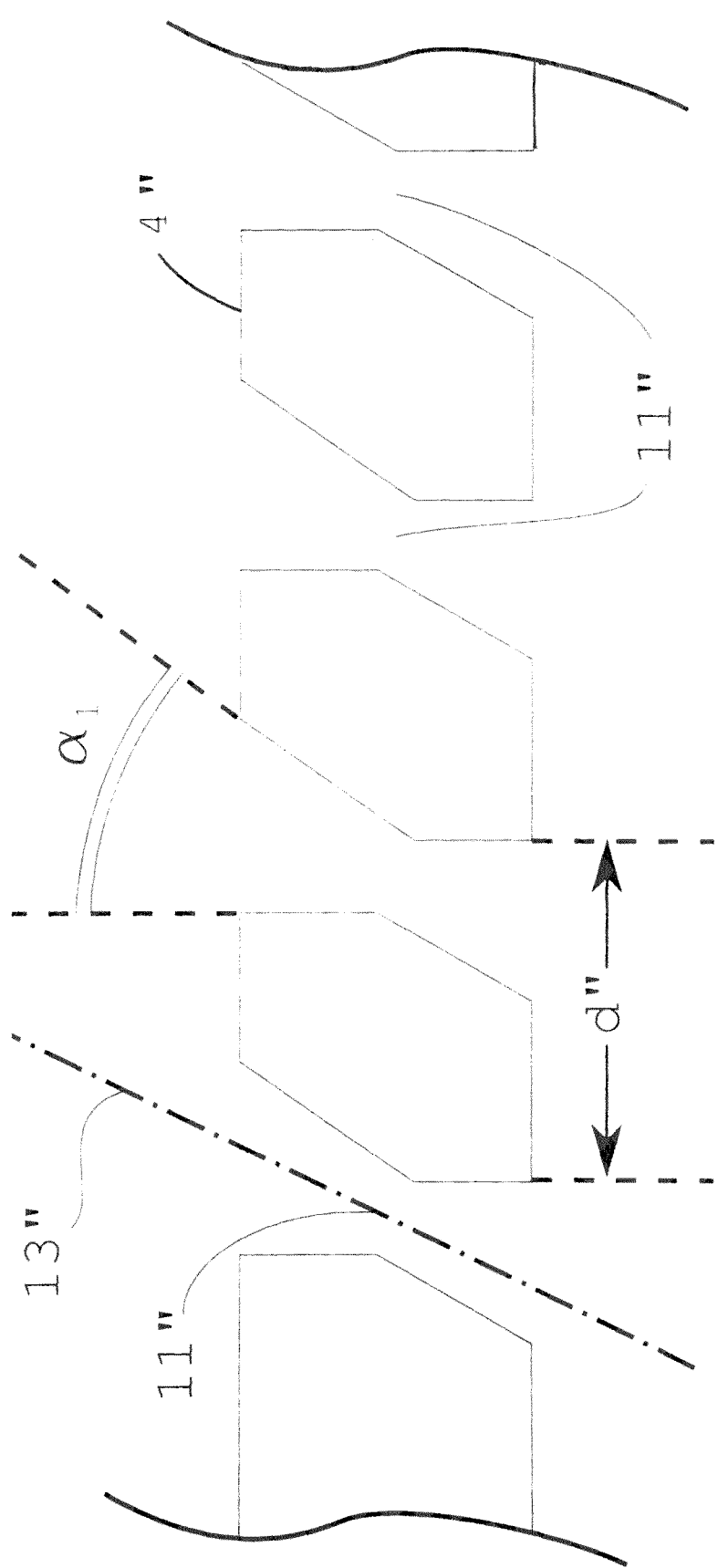

FIG. 3 shows, in a schematic cross-sectional view, a part of a collimator 4" now with four pinholes 11", each with an image angle $\alpha_1$ and a central line 13". The pinholes 11" are here placed with a slightly larger mutual spacing d" than necessary, and here there is no cone point or similar. Therefore there is less blurring due to penetration than in the collimator 4'. It is clear that the maximum pinhole density which can be achieved is nonetheless much higher than in the prior art.

It is noted that the pinholes 11" shown each see only "one half" of the field of view which the pinholes 11'-1 and 11'-2 in FIG. 2 can see in total. This can be compensated in various ways.

Firstly, in practice, as visible in FIG. 1, often a round annular collimator is used in which the pinholes 11"—which then are also arranged in a ring form—together image ("see") the entire focus volume. Alternatively or additionally, this is compensated by providing a second group of pinholes with, in this figure, central lines arranged symmetrically in the vertical. Thus in fact each cluster 10' of the prior art in FIG. 2 is split differently from placing the separate pinholes as close as possible together. Note that if this second group of pinholes 11'-2 is also arranged in a ring form, they also again as a whole see the same focus volume. For this, it is necessary for the second group of pinholes, which always stand in a different position with respect to the focus volume, to also be placed obliquely with respect to the transaxial plane, the plane perpendicular to the longitudinal axis. This means that the mean direction of the central lines of the pinholes 11'-2, and furthermore also those of the first group 11'-1, is directed at the geometric center of the focus volume.

The pinholes 11'-1 oriented in the same direction are placed in one group, as shown in FIG. 3, and the other pinholes 11'-2 oriented in the same direction are placed in another group (not shown here). Together, the two groups give approximately the same angular information as the group of clusters from the prior art, but with a greater density due to the higher pinhole density, but nonetheless with less blurring.

In fact, the invention uses the finding that it is not necessary to place the pinholes of a cluster directly next to one another, but that it is also possible to arrange them differently. The advantages are, as described above, a higher achievable pinhole density and less blurring. It is pointed out that in the flat collimators shown however, the achievable pinhole density is limited rather by preventing overlap on the detector, unless an enlargement of maximum a factor of 1 is desired. However, in tubular collimators, the pinhole density plays a greater role because the field of views spread in the direction of the detector and therefore there is more space for placing the pinholes closer together.

Figure 4:
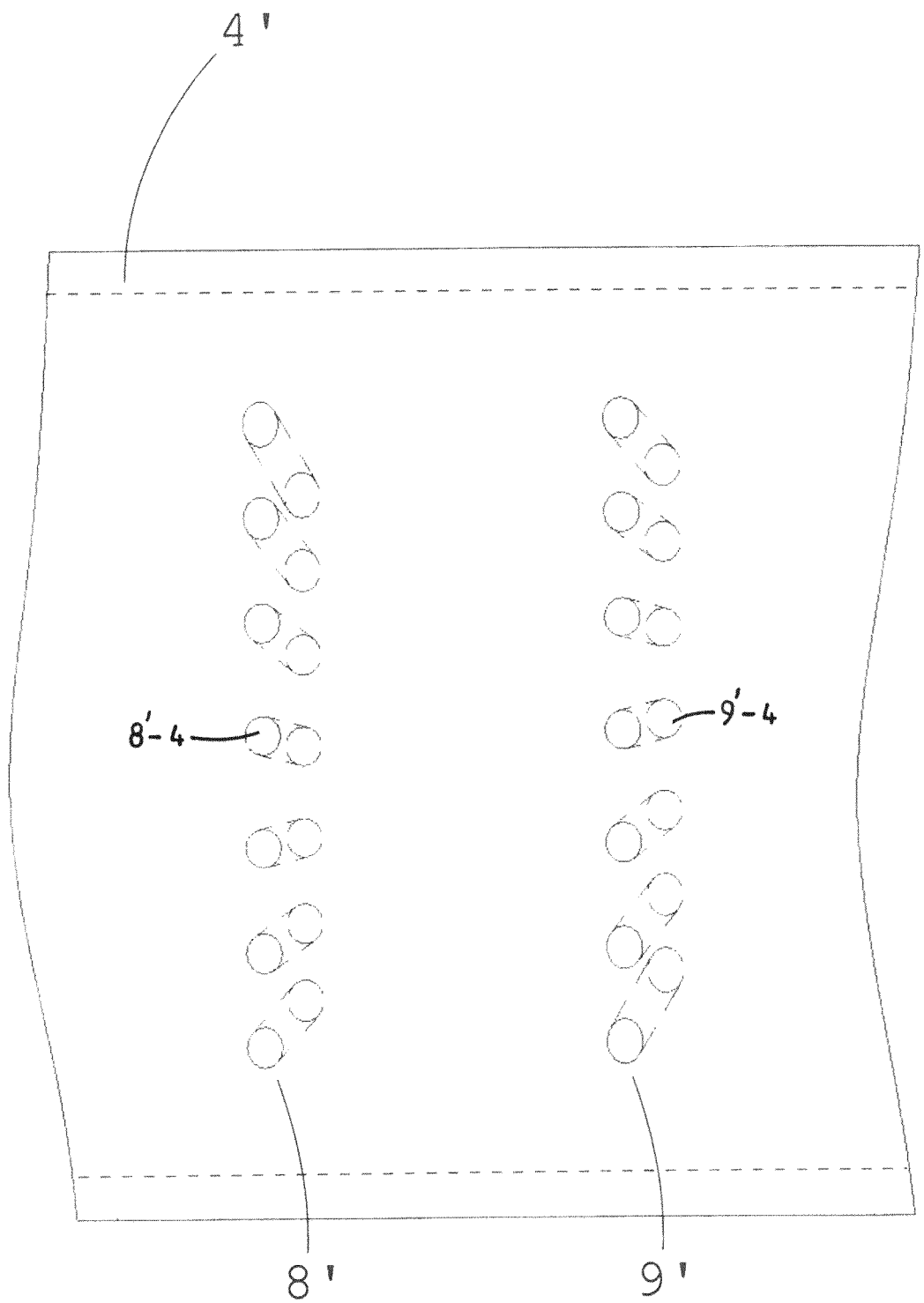

FIG. 4 shows a schematic side view, partially through a part of a collimator 4' in a gamma camera device according to the invention. This comprises a first group of pinholes 8' and a second group of pinholes 9'. All pinholes in the figure run towards the inside to the right, so that the focus volume (not shown here), i.e. the volume which can finally be seen through all groups of pinholes, also lies to the right. It is important to note that both groups 8' and 9' lie on one side of the focus volume. This offers the advantage that a distortion in the one group, caused by the mean distance from the focus volume to the detector through the pinhole on one edge of the field of view being greater than on the opposite edge of the field of view, can be compensated because the distortion for the corresponding edges of the field of view through the pinholes of the other group, due to the mean distance, is precisely the reverse.

The respective central lines through the pinholes 8' of the first group, viewed from the left in a longitudinal direction of the collimator and coming from the pinholes, pass said longitudinal axis 5 in each case at a distance on the right side. This means that pinhole 8'-4, which in FIG. 4 lies at half way up the collimator, points slightly downward. Conversely, the respective central lines of the pinholes 9' of the second group, viewed from the left in a longitudinal direction of the collimator and coming from the pinholes, each pass said longitudinal axis on the left side. This means that pinhole 9'-4, which in the figure lies half way up the collimator, points slightly upward. Since the central lines of the pinholes in a group may become mutually congruent on rotation, the direction of the respective central lines is established as a function of the site/angle on the collimator. For example, if the pinholes 8' are evenly distributed over the periphery and are 16 in number, then the central line of a pinhole 8' becomes congruent with another central line of another pinhole 8' in the group on rotation through 360/16=22.5° or a multiple thereof.

Figure 5:
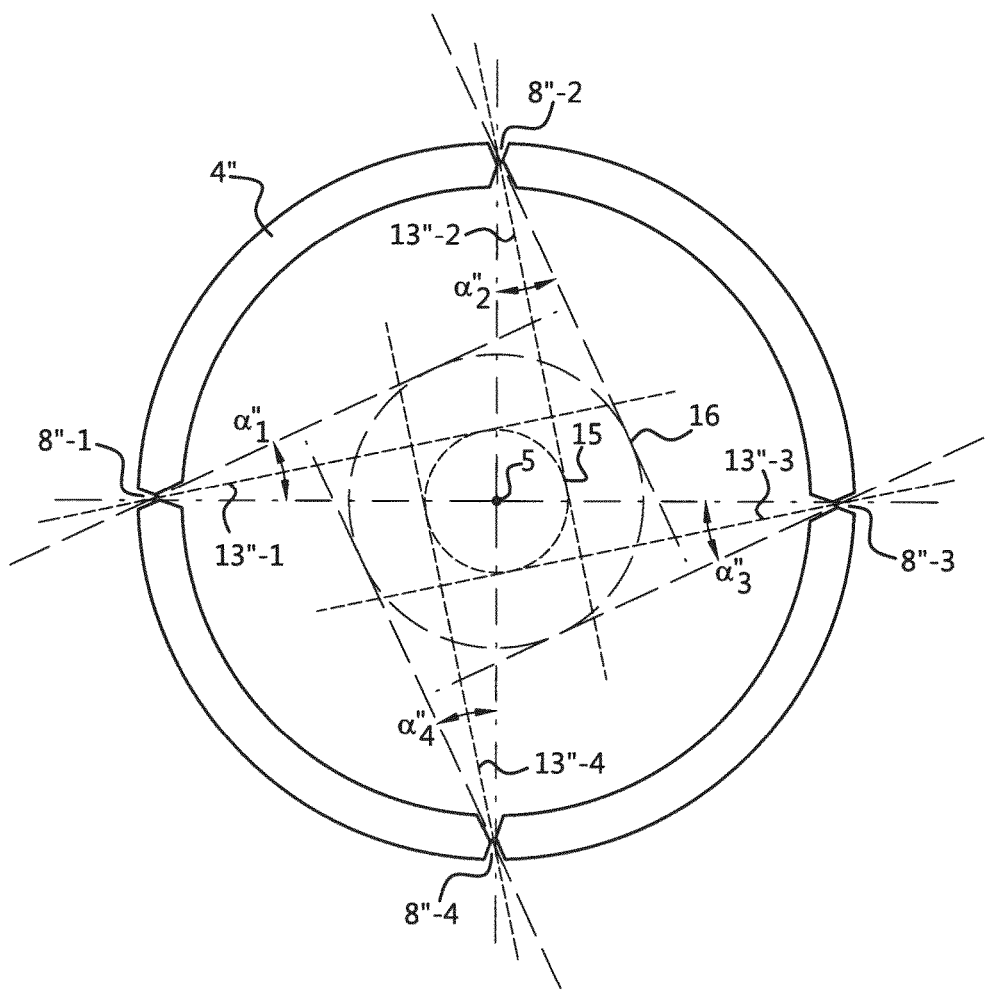

FIG. 5 shows a schematic cross-section through a collimator 4" viewed in the longitudinal direction.

The collimator 4" is tubular with a radiation-impermeable wall which extends around the object space. As preferred, the tubular wall is cylindrical, wherein the object space and the collimator have a common longitudinal axis 5.

Pinholes are arranged in the wall of the collimator 4". Gamma radiation emitted by an object present in the object space passes through the pinholes and is incident on detectors (not shown in detail) of the gamma camera device, in the known fashion.

For the sake of simplicity, FIG. 5 shows only four pinholes 8"-1 to 8"-4 of one group, together with their central lines 13"-1 to 13"-4 and image angles/field of views $\alpha"$-1 to $\alpha"$4. Again, 5 indicates the longitudinal axis of the collimator 4", and 15 the theoretical ring or cylinder around the longitudinal axis 5 which the central lines of all pinholes of the group touch, and 16 the focus volume.

The following description is based on one pinhole 8"-1 which serves as a role model for the others in the group. Firstly, it is pointed out that the central lines of the pinholes in the group shown all stand "obliquely", which means they do not intersect the longitudinal axis 5 but pass this at a distance on one side.

FIG. 5 illustrates that, in the group of pinholes shown, on a rotation around the longitudinal axis 5, the central line becomes congruent with the central lines of each of the other pinholes of the group.

To limit the number of lines in FIG. 5, it has been chosen to allow one edge of a field of view to run precisely through the middle of the collimator 4". In practice, it would be better to select the field of view (image angle $\alpha"$) of each pinhole 8" slightly wider and allow the central lines to overlap.

Pinhole 8"-1 has a central line 13"-1 and an image angle $\alpha"$-1. The part of the volume which is imaged by the pinhole 8"-1 lies between the horizontal line in the figure which passes through the longitudinal axis 5 and the line running obliquely above. This roughly accounts for half of the entire focus volume 16. Also, it can be compensated by the field of view $\alpha"$-3 of the opposite pinhole 8"-3, so that pinholes 8"-1 and 8"-3 together in principle see the entire focus volume 16. Now this is in turn supplemented in that the pinholes of another group (not shown here), preferably but not necessarily located adjacent thereto, point precisely in the other direction of the longitudinal axis 5. It is pointed out here that the focus volume 16 is here indicated as a circle, while for a static collimator with four pinholes, this naturally has a more or less rounded diamond-like cross-section. However, the collimator may also be designed to be rotatable about the longitudinal axis 5, whereby the mean focus volume has rather a circular cross-section. In addition, the focus volume 16, viewed in cross-section transversely to the longitudinal axis 5, has a more circular form as the number of pinholes increases.

In the example shown in FIG. 5, this means that a pinhole in an adjacent group lies at the height of pinhole 8"-1 but has a field of view and central line which are arranged symmetrically in the horizontal line which runs from pinhole 8"-1 to 8"-3 (more precisely: symmetrically in the plane formed by said line and the longitudinal axis 5). Note that this pinhole in FIG. 5 would in fact lie at the same point as pinhole 8"-1 because it is always a side view along the longitudinal axis, and hence more or less a projection onto a plane perpendicular to the longitudinal axis. It is understood that the field of view of said adjacent pinhole and the field of view $\alpha"$-1 of pinhole 8"-1 together in fact cover the entire focus volume, or the entire focus volume 16. The two pinholes together then in fact form two pinholes which are comparable to the two pinholes 11'-1 and 11'-2 in the cluster 10'-1 of FIG. 2.

It is clear that the complete, total focus volume can be considered to be constructed from the part of the volume which is seen through at least one of the pinholes of one group. It is then easy to guarantee—and advantageous—that the same volume is also seen through the pinholes of another, and preferably each other, group.

Figure 6:
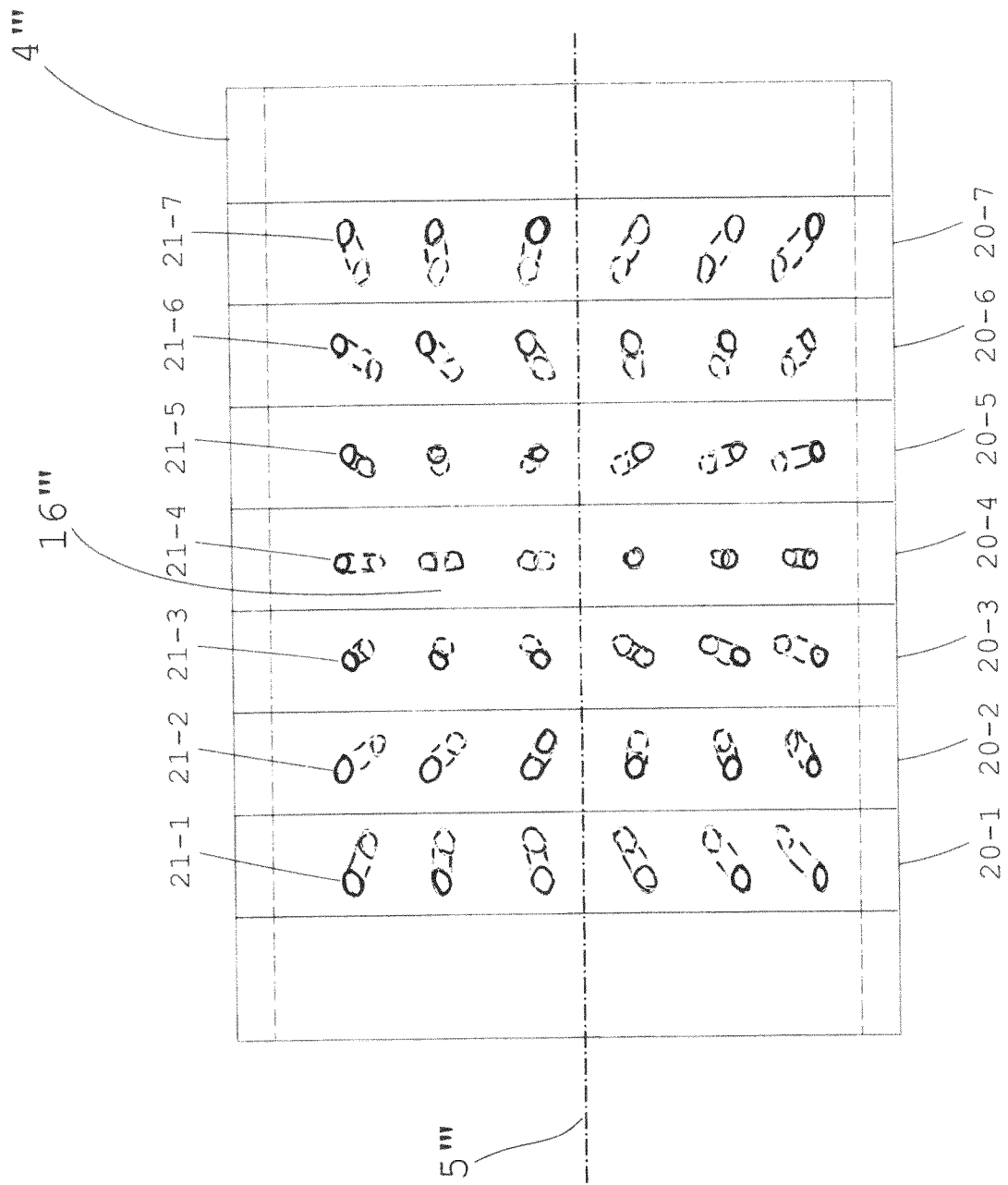

FIG. 6 shows a schematic side view of a collimator 4'''. The collimator 4''' has a longitudinal axis 5''' and is constructed from seven physical rings of collimator material 20-1 to 20-7, each with an associated group of pinholes 21-1 to 21-7 in an annular arrangement. For some pinholes, the channel through the associated ring is depicted schematically with a dotted line. All pinholes together sweep the focus volume 16'''.

It is clear that the groups 21-1 and 21-7, 21-2 and 21-6, 21-3 and 21-5 each form a respective first group and second group of pinholes according to the invention, i.e. passing the longitudinal axis 5''' in opposite directions. If the ring 20-7 is arranged symmetrically in a plane perpendicular to the longitudinal axis 5''' and imaged on the ring 20-1, and thereby the pinholes of groups 21-1 and 21-7 are placed in one and the same ring, approximately the same clusters are obtained as according to the known EP 2073039. However, according to the present invention, it is also possible to provide more pinholes per group 21 because there is no need for them to be placed in such a way.

It is also noted that the central ring 20-4 has a group of pinholes 21-4 which are all directed with their central lines on the longitudinal axis 5''', and hence are different from the pinholes of the respective first and second groups 21-1, 21-2, . . . . Nonetheless, these pinholes 21-4 are also preferably directed eccentrically, i.e. their central line passes the longitudinal axis 5 at a distance, with their central line tangential to the theoretical circle or cylinder 16 around the longitudinal axis 5, and hence have the same advantages such as lower blurring due to penetration.

All groups 21-1 to 21-7 together see the focus volume 16''', and hence this collimator (and the associated gamma camera device) furthermore has all advantages of a focused collimator, such as a higher achievable radiation sensitivity and resolution. According to the invention, it is thus possible to give each pinhole an image angle which is smaller than necessary to individually see the entire central focus volume 16''', such as roughly half thereof.

According to some embodiments, it is also possible to provide an even smaller field of view per pinhole, as is the case in FIG. 6, roughly one-sixth or even one-eighth (in practice, slightly more because of desired overlap) of the cross-section of the central focus volume 16'''. In order still to be able to see the entire central focus volume, it is desired that the different rings also image different parts of the focus volume 16'''. As an example, the pinholes of ring 21-1 and 21-7 image the innermost third or quarter of the volume 16''' (in each case by cross-section, not by volume), the pinholes of rings 21-2 and 21-6 image the next innermost third or quarter, the pinholes of rings 21-3 and 21-5 image the outermost third or second outermost quarter, and the pinholes of ring 21-4 image any third or the outermost quarter of the central focus volume 16'''. Also, different orders and configurations are possible. It is important to note that always the entire volume 16''' is imaged, but with pinholes with a very small image angle and hence less blurring.

Also, the collimator is shown here as a stack of physical rings 20-1 to 20-7, for example because of a desired modularity or easier production of the collimator It is expressly pointed out that it is also possible to combine one or more or all rings into one collimator body.

The embodiments shown are intended purely for illustration of the invention without restricting this in any way. The scope of protection is however determined by the appended claims.

The invention claimed is:

1. A gamma camera device for producing an image of an object by gamma radiation, comprising:
a tubular collimator with pinholes, the collimator extending about an object space configured for receiving the object;
a detection device with at least one detector having a detector surface for detecting, as detector signals, gamma radiation emitted by the object and passing through pinholes of the collimator; and
a controller configured for processing the detector signals into said image of the object,
wherein the collimator and the object space have a common longitudinal axis with a longitudinal direction,
wherein the collimator comprises a plurality of groups of pinholes, each group composed of multiple pinholes, each pinhole having a central line,
wherein for each of said groups, the pinholes lie in a plane perpendicular to the longitudinal axis,
wherein the pinholes of said groups together see a focus volume, the focus volume having a geometric center, and
wherein within each of said groups, the respective central line of each of said pinholes passes said longitudinal axis at a distance therefrom, and on a rotation around said longitudinal axis, the central line becomes congruent with the central line of each of the other pinholes of said group.

2. The gamma camera device according to claim 1, wherein of a first group of said groups, viewed from the respective pinhole, the respective central line in each case passes said geometric center to the right thereof, and the respective central line of the second group of said groups, viewed from the respective pinhole, in each case passes said geometric center to the left thereof.

3. The gamma camera device according to claim 2, comprising multiple of said first groups and/or multiple of said second groups.

4. The gamma camera device according to claim 3, wherein the first groups and the second groups alternate with one another viewed in said longitudinal direction, such that one second group is arranged between a pair of first groups.

5. The gamma camera device according to claim 2, wherein the central lines of both one or each said first group and of one or each said second group pass said geometric center at a distance not equal to zero.

6. The gamma camera device according to claim 3, wherein the central lines of both one or each said first group and of one or each said second group pass said geometric center at a distance not equal to zero, and wherein said distance differs for at least two of the first groups and/or for at least two of the second groups.

7. The gamma camera device according to claim 1, wherein each of said groups is rotationally symmetrical around said longitudinal axis.

8. The gamma camera device according to claim 1, wherein the collimator comprises one or more annular collimator parts, each with one or more of said groups.

9. The gamma camera device according to claim 1, furthermore comprising a supplementary group of pinholes, wherein the respective central lines of said supplementary group intersect said geometric center.

10. The camera device according to claim 1, further comprising precisely one supplementary group of pinholes, wherein the respective central lines of said supplementary group intersect said geometric center.

11. The camera device according to claim 10, wherein all central lines of said supplementary group lie in a plane perpendicular to the longitudinal axis.

12. The gamma camera device according to claim 1, wherein the device is configured for rotation of the collimator about the longitudinal axis.

13. A gamma camera device for producing an image of an object by gamma radiation, comprising:
a collimator with pinholes, the collimator extending about an object space configured for receiving the object;
a detection device with at least one detector having a detector surface for detecting, as detector signals, gamma radiation emitted by the object and passing through pinholes of the collimator; and
a controller configured for processing the detector signals into said image of the object,
wherein the collimator and the object space have a common longitudinal axis with a longitudinal direction,
wherein the collimator comprises a plurality of groups of pinholes, each group composed of multiple pinholes, each pinhole having a central line,
wherein for each of said groups, the pinholes lie in a plane perpendicular to the longitudinal axis,
wherein the pinholes of said groups together see a focus volume, the focus volume having a geometric center, and
wherein within each of said groups, the respective central line of each of said pinholes passes said longitudinal axis at a distance therefrom, and on a rotation around said longitudinal axis, the central line becomes congruent with the central line of each of the other pinholes of said group,
wherein of a first group of said groups, viewed from the respective pinhole, the respective central line in each case passes said geometric center to the right thereof, and the respective central line of the second group of said groups, viewed from the respective pinhole, in each case passes said geometric center to the left thereof, and
wherein the gamma camera device comprises multiple of said first groups and/or multiple of said second groups.

14. The gamma camera device according to claim 13, wherein the first groups and the second groups alternate with one another viewed in said longitudinal direction, such that one second group is arranged between a pair of first groups.

15. The gamma camera device according to claim 13, wherein the central lines of both one or each said first group and of one or each said second group pass said geometric center at a distance not equal to zero.

16. The gamma camera device according to claim 13, wherein the central lines of both one or each said first group and of one or each said second group pass said geometric center at a distance not equal to zero, and wherein said distance differs for at least two of the first groups and/or for at least two of the second groups.

* * * * *